United States Patent
Bober

(10) Patent No.: US 7,362,921 B1
(45) Date of Patent: Apr. 22, 2008

(54) METHOD AND APPARATUS FOR REPRESENTING AND SEARCHING FOR AN OBJECT USING SHAPE

(75) Inventor: Miroslaw Bober, Guildford (GB)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/959,469

(22) PCT Filed: Apr. 28, 2000

(86) PCT No.: PCT/GB00/01662

§ 371 (c)(1),
(2), (4) Date: Dec. 21, 2001

(87) PCT Pub. No.: WO00/67151

PCT Pub. Date: Nov. 9, 2000

(30) Foreign Application Priority Data

Apr. 29, 1999 (GB) ................................ 9909963.2

(51) Int. Cl.
G06K 9/00 (2006.01)
G06K 9/48 (2006.01)
G06K 9/54 (2006.01)
G06F 7/00 (2006.01)
A61B 6/02 (2006.01)
H04N 5/14 (2006.01)
H04N 5/225 (2006.01)

(52) U.S. Cl. ...................... 382/305; 382/103; 382/128; 382/199; 707/1; 707/102; 378/41; 348/26; 348/169

(58) Field of Classification Search ................ 382/100, 382/103, 107, 128, 131, 132, 173, 199, 203, 382/225, 305, 306; 707/1–5, 101–102; 378/41; 348/26, 42, 169–172
See application file for complete search history.

(56) References Cited

U.S. PATENT DOCUMENTS 4,179,824 A * 12/1979 Marsh ........................ 345/427

(Continued)

FOREIGN PATENT DOCUMENTS

GB      1 403 765      8/1975

(Continued)

OTHER PUBLICATIONS

Cao et al., IEEE Publication, 1993, "A modeling technique for the recognition and attitude estimation of 3-D objects". (pp. 634-637).*

(Continued)

*Primary Examiner*—Jingge Wu
*Assistant Examiner*—Manav Seth
(74) *Attorney, Agent, or Firm*—Birch, Stewart, Kolasch & Birch, LLP

(57) ABSTRACT

A method is disclosed for representing a sequence of images constituting a moving image by processing signals corresponding to the image. An object appearing in one image is identified in the sequence in a first perspective view, and the same object appearing in another image is identified in the sequence in a second perspective view. A view descriptor of the outline of the object in the first perspective view is derived and at least one additional view descriptor of the outline of the object in another perspective view is also derived. The two or more view descriptors are associated to form a descriptor which is a single indexable entity for the sequence of images.

7 Claims, 5 Drawing Sheets

3D Object shape descriptor consisting of a global 3D shape descriptor and multiple 2D (planar) descriptors for multiple views

U.S. PATENT DOCUMENTS

| | | | |
|---|---|---|---|
| 5,144,685 A | | 9/1992 | Nasar et al. |
| 5,434,966 A | * | 7/1995 | Nakazawa et al. .......... 345/617 |
| 5,682,468 A | | 10/1997 | Fortenbery et al. |
| 5,852,823 A | * | 12/1998 | De Bonet ...................... 707/6 |
| 6,016,487 A | * | 1/2000 | Rioux et al. ................... 707/2 |
| 6,115,717 A | | 9/2000 | Mehrotra et al. |
| 6,182,069 B1 | * | 1/2001 | Niblack et al. ................ 707/6 |
| 6,366,797 B1 | * | 4/2002 | Fisher et al. ................ 600/410 |
| 6,591,004 B1 | * | 7/2003 | VanEssen et al. ........... 382/154 |
| 6,631,364 B1 | | 10/2003 | Rioux et al. |

FOREIGN PATENT DOCUMENTS

| | | |
|---|---|---|
| GB | 1 537 322 | 12/1978 |
| GB | 2 085 629 | 4/1982 |
| WO | 98 21688 | 5/1998 |

OTHER PUBLICATIONS

Kelly et al., IEEE Publication, 1995, "Where and What: Object perception for autonomous robots". (pp. 261-267).*

Mokhtarian et al., IEEE Publication, 1996, "Indexing an image database by shape content using curvature scale space". (pp. 4/1-4/6).*

Cappellini et al., IEEE Publication, 1987, "From multiple views to object recognition". (pp. 1344-1350).*

Jones et al., IEEE Publication, 1995, "A new representation for fast 3D reconstruction from multiple perspective images". (pp. 4/1-4/3).*

Lee et al., IEEE Publication, 1994, "Indexing for complex queries on a query-by-content image database". (pp. 142-146).*

Flickner et al., IEEE Publication, 1995, "Query by image and video content: the QBIC system". (pp. 23-32).*

Jain et al., IEEE Publication, 1997, "3D video generation with multiple perspective camera views". (pp. 9-12)□□.*

Mokhtarian et al., IEEE Publication, Sep. 1999, "Shape similarity under affine transform: application to multiview object representation and recognition". (pp. 20-27).*

Chien et al., IEEE Publication, 1989, "Model construction and shape recognition from occluding contours" (pp. 372-389).*

Farzin Mokhtarian et al., "Robust and Efficient Shape Indexing through Curvature Scale Space," Vision Speech and Signal Processing Group Dept. of Electronic & Electrical Engineering, British Machine Vision Conference, University of Surrey, England.

Kuhl F.P. et al.: "Global Shape Recognition of 3-D Objects Using a Differential Library Storage" vol. 27, No. 1, Jul. 1, 1984 pp. 97-114, XP002012880.

Bradski G. et al.: "Fast-Learning Viewnet Architectures for Recognizing Three-dimensional Objects from Multiple Two-dimensional Views"vol. 8, No. 7, Jan. 1, 1995, pp. 1053-1080, XP004000070.

Mokhtarian F. et al.: A New Apparoach to Compution of Curvature Scale Space Image for Shape Similarity Retrieval 1997, XP000901389.

Eakins, John P. et al, "Similarity Retrieval of Trademark Images," University of Northumbria at Newcastle, IEEE MultiMedia, Apr.-Jun. 1998, pp. 53-63.

Eakins, John P. et al, "Retrieval of Trademark Images by Shape Feature-the ARTISAN project," University of Northumbria at Newcastle, IEEE, IEE Colloquium on, London, UK, May 26, 1996, pp. 9/1-9/6.

* cited by examiner

METHOD AND APPARATUS FOR REPRESENTING AND SEARCHING FOR AN OBJECT USING SHAPE

This application is the national phase under 35 U.S.C. § 371 of PCT International Application No. PCT/GB00/01662 which has an International filing date of Apr. 28, 2000, which designated the United States of America and was published in English.

BACKGROUND OF THE INVENTION

1. Field of the Invention

The present invention relates to a method and apparatus for representing an object in an image using shape, especially for use in searching. The invention also relates to a method and apparatus for searching for an object in a image using a shape representation.

2. Description of the Related Art

It is known to store still or video images, for example in image libraries, using representations of objects appearing in images. The representations are used in searching methods to enable images containing objects of interest to be retrieved. The representations may be based on various features of the objects, including colour, texture and shape.

Various methods for representing shapes of objects in images are known. Known methods include chain coding, the quad-tree method and the curvature scale space representation method.

To perform a search in a image searching system, a user inputs a query by presenting the system with a sketch or image of the object sought, or by selecting a view of an object stored on the system. The system then derives or obtains a representation of the query object and compares the query representation with the representations of images stored in the database using an appropriate matching method. The closest matches are displayed on a display unit.

In most cases, an object as it appear; in a video image is a projection of a 3-dimensional real object onto a 2-dimensional image plane. The 2-dimensional shape or outline of an object appearing in an image thus depends on factors such as the viewing position, viewing angle and camera and optical system parameters. Objects will therefore have different outlines associated with different views.

A disadvantage of known image database systems is that different views of an object having different outlines are treated as different objects. As a result for example, if a user inputs a query based on a front view of an object A, and the object A only appears in a video sequence from the rear and side view, no successful matches will result and the object will not be retrieved.

SUMMARY OF THE INVENTION

The present invention provides a method of representing an object appearing in a digital image comprising deriving representations of a plurality of different 2-dimensional views corresponding to the object.

The invention also provides a method of matching objects comprising inputting a query and comparing the query with the plurality of representations of different views of objects to find the closest match or matches, by processing signals corresponding to images of objects.

BRIEF DESCRIPTION OF THE DRAWINGS

An embodiment of the invention will be described with reference to the accompanying drawings of which.

DETAILED DESCRIPTION OF THE INVENTION

Figure 1:
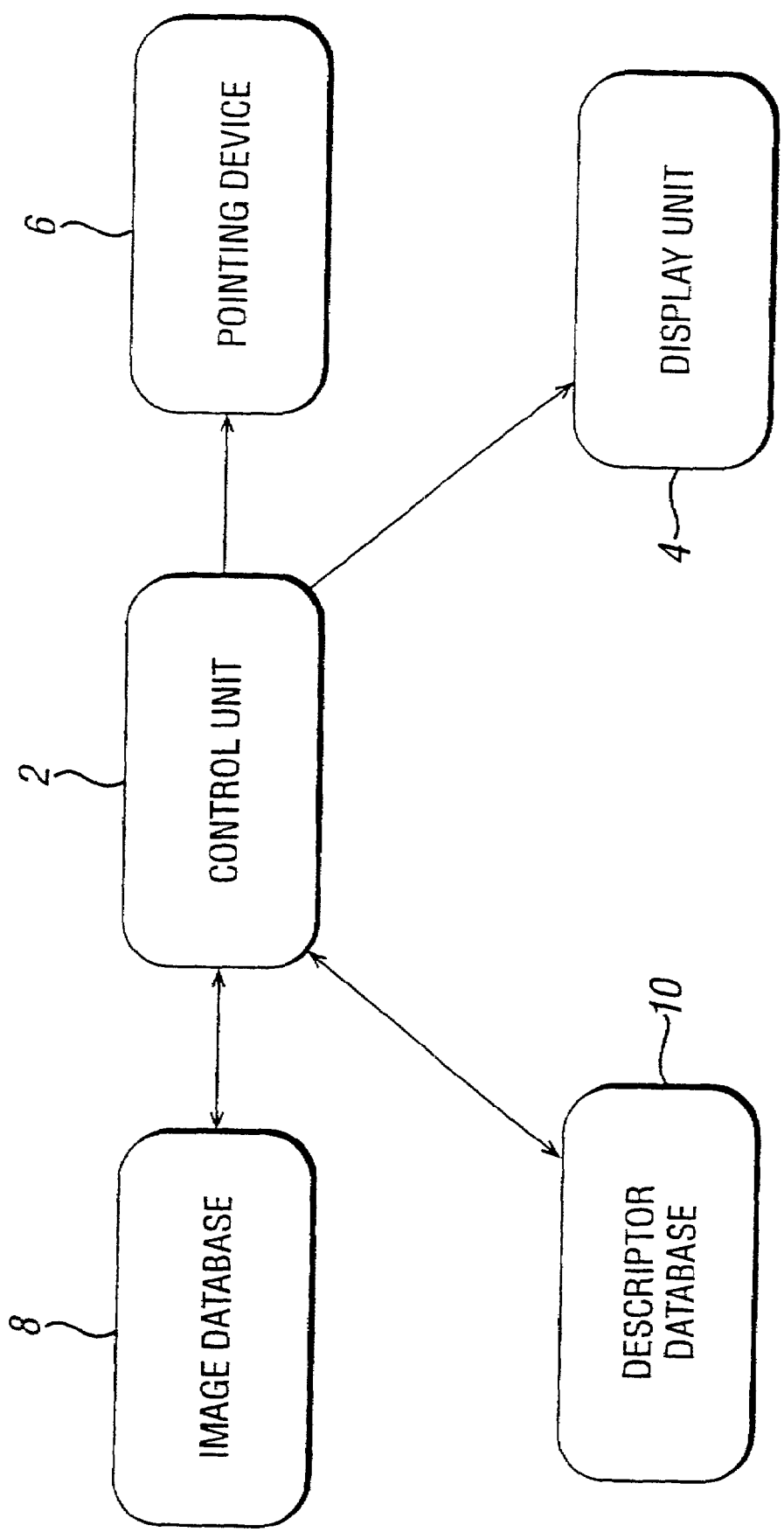
FIG. 1 is a block diagram of a system according to an embodiment of the invention.

A system according to an embodiment of the invention is shown in FIG. 1. The system includes a control unit 2 such as a computer for controlling operation of the system, a display unit 4 such as a monitor, connected to the control unit 2, for displaying outputs including images and text, and a pointing device 6 such as a mouse for inputting instructions to the control unit 2. The system also includes an image database 8 storing digital versions of a plurality of video sequences and a descriptor database 10 storing descriptor information, described in more detail below, for objects appearing in each of the video sequences stored in the image database 8. Each of the image database 8 and the descriptor database 10 is connected to the control unit 2.

In this embodiment, the elements of the system are provided on a single site, such as an image library, where the components of the system are permanently linked.

Figure 2:
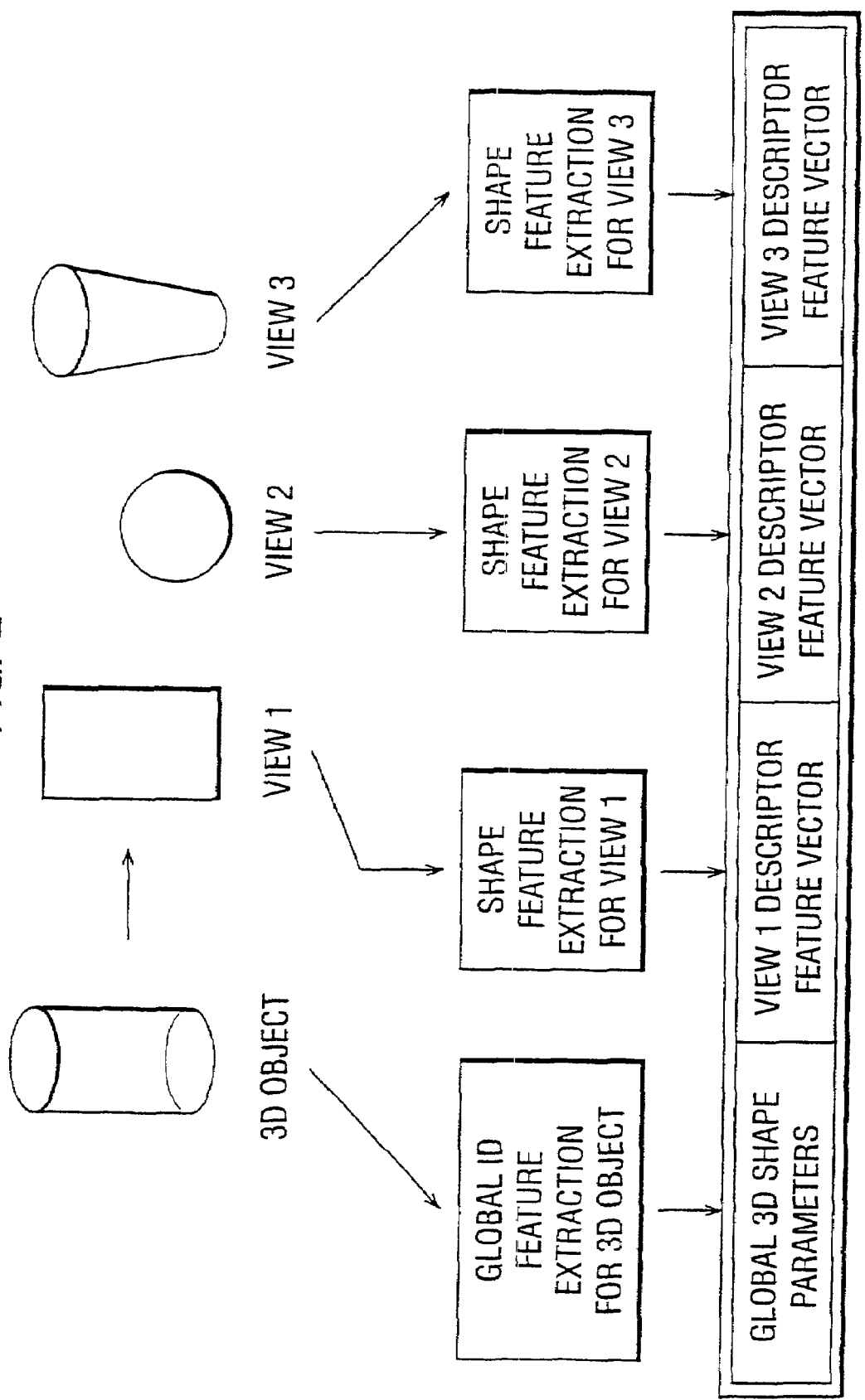
FIG. 2 is a diagram showing how a descriptor for an object is obtained.
Figure 3:
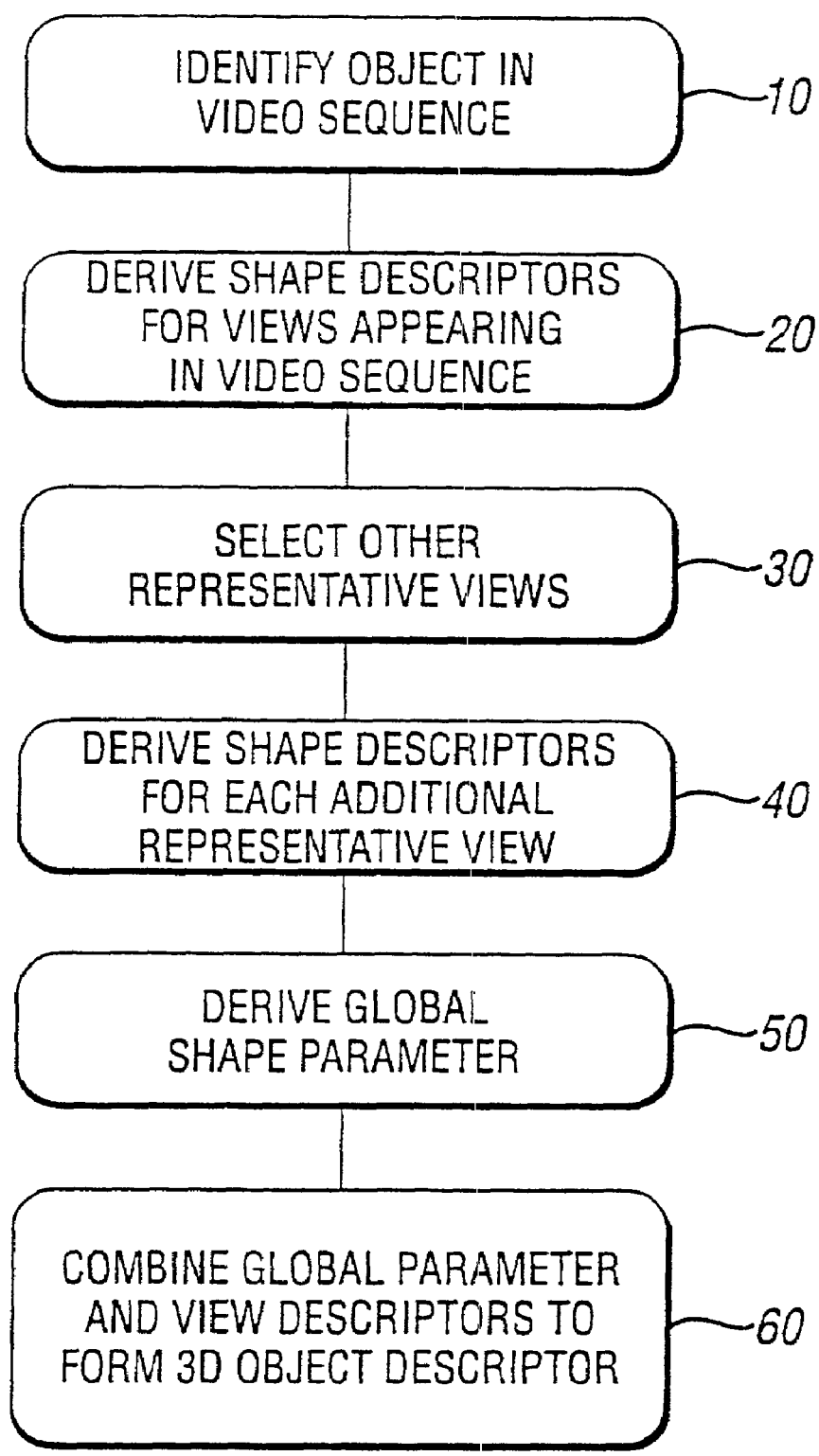
FIG. 3 is a flowchart illustrating how a descriptor for an objector is obtained.

A method of deriving a descriptor for an object according to an embodiment of the invention will be described with reference to FIGS. 2 and 3. The method will be described for an object having a relatively simple shape, in this case a cylindrical object.

In this example, in a video sequence stored in the image database 8, the cylindrical object appears twice. Referring to FIG. 2, in the first appearance, the object outline corresponds to view 1, that is a view from the side and in the second appearance, the object outline corresponds to view 3, that is a perspective view from the side and above.

The steps of the method will now be described with reference to the flowchart shown in FIG. 3.

The database indexer recognises that the two outlines are of the same object and that the 3-dimensional object corresponding to those outlines is a cylinder (step 10). For each of view 1 and view 3, shape descriptors using the curvature scale space (CSS) representation are derived (step 20). Also, the database indexer selects any additional views that are deemed representative of the object, even if they do not appear in the video sequence under consideration (step 30). In this example, view 2, which is a view of a cylinder from above, is selected as representative. A CSS representation of that view is also obtained (step 40).

The paper "Robust and Efficient Shape Indexing through Curvature Scale Space" by Farzin Mokhtarian, Sadegh Abbassi and Josef Kittler, Proc. British Machine Vision Conference, pp. 53-62, Edinburgh, U. K. 1996 describes a method of curvature scale space representation. Briefly, a curve representing the outline of a shape is evolved by smoothing the curve. The curve is considered at a number of different stages in the evolution. More specifically, the curvature zero crossings are identified in a curvature function at each of the stages of the evolution. A graph of the curvature zero crossings is obtained by combining zero crossing from all stages of the evolution. One axis of the graph corresponds to δ which represents the evolution parameter of the curve and the other axis corresponds to a curve arc length parameter u. A shape is then represented by the locations of the maxima of the contours in the graph.

In addition to CSS shape representations of representative views of the object, a global 3D shape parameter of the object, which is independent of the view of the object, is obtained (step 50). In this example, the global parameter is the volume of the object in real life. The volume may already be known, or it may be approximated with reference to other objects appearing in the video sequence, such as people, for which dimensions can be approximated.

The global parameter and the view shape descriptors are combined to form a 3D object shape descriptor (step 60).

3D object shape descriptors are obtained in the above manner for all objects of interest appearing in images in the image database 8. The number of views for any given object and which views are used depends on the complexity of the object. Some objects may have no global parameter in the 3D object shape descriptor, for example, if a value for a volume is not known or not easily derived. Each view has a reference pointer indicating in which frame in the video sequence it appears, and also which object in the frame it is, for example, a view of an object may have a pointer indicating that it appears in frame 1000 and it is object number 3.

In other embodiments using different shape representation methods, the number and nature of the views will also depend on the shape representation method used. For example, a method that is less sensitive to shape deformation resulting from changes in viewing geometry will require a smaller number of views.

The descriptor database 10 stores the 3D object shape descriptors for the objects in video sequences stored in the image database 8.

Figure 4:
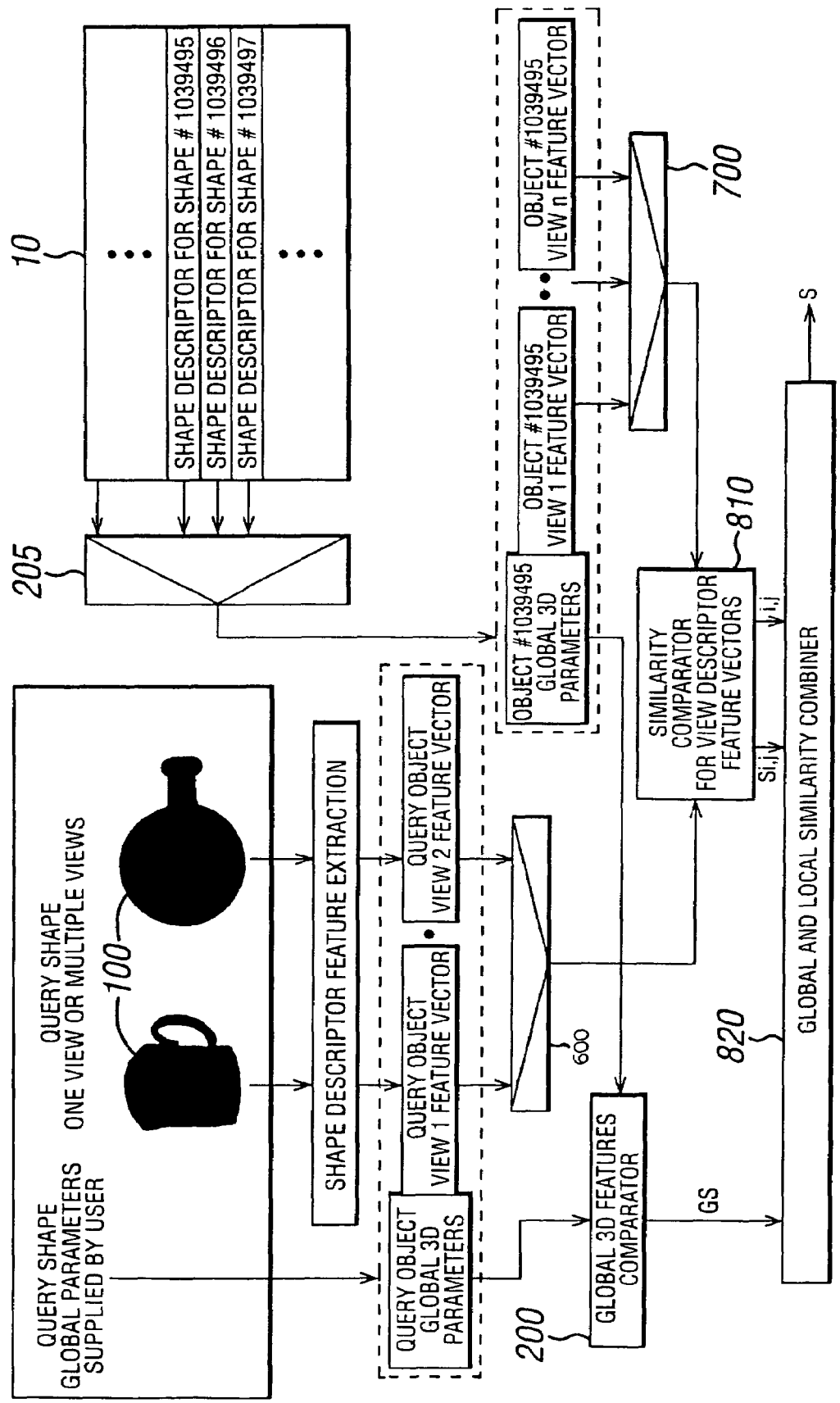
FIG. 4 is a diagram illustrating an apparatus and method for searching.
Figure 5:
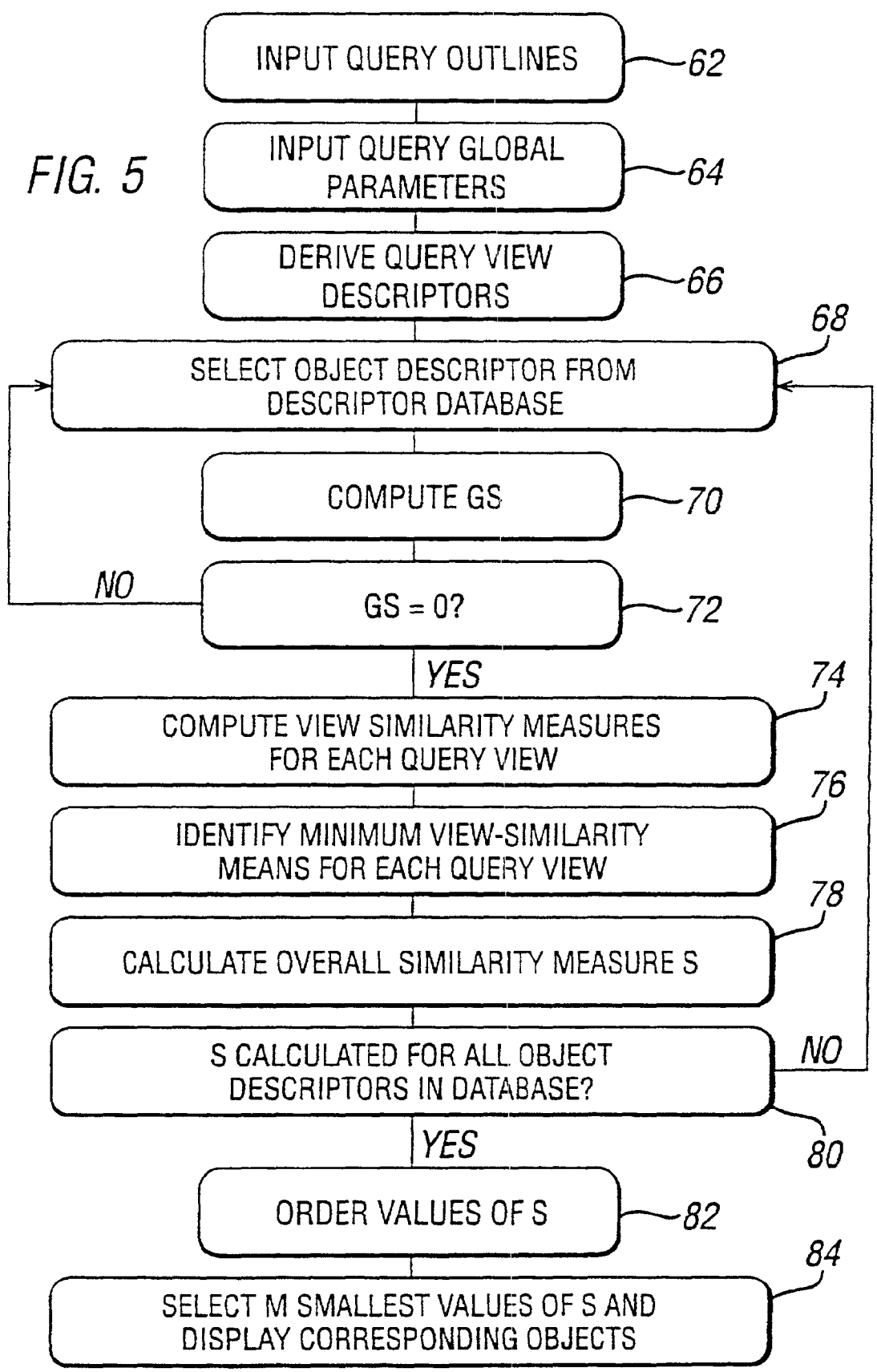
FIG. 5 is a flowchart illustrating a search method.

A method of searching for an object in a video sequence will now be described with reference to FIGS. 4 and 5.

The user initiates a search by inputting a query. The query is input by using the pointing device 6 to draw one or more shape outlines on the display unit 4 (step 62). In this example, two query outlines 100 are input. These are the query views. The user also inputs a parameter representing the volume of the object for which he is searching (step 64).

The control unit 2 then derives the CSS view descriptor for each of the query views (step 66).

In an alternative embodiment, the user inputs a query by selecting a query shape or shapes from a menu of shapes displayed on the display unit 4 by the control unit 2. In such an embodiment, the view descriptors may already be available in the descriptor database 10.

The query volume parameter and the query view descriptors are combined to form a query 3D object descriptor.

The system then performs a matching procedure for determining the similarity between the query object descriptor and the object descriptors stored in the descriptor database 10, hereinafter described as model object descriptors. Each model object descriptor in the descriptor database is selected in turn by a selector 205 (step 68) and the following steps are performed for each model object descriptor in its turn.

Firstly, a global similarity measure GS is obtained (step 70) by a comparator 200, using the global parameters for the query object descriptor and the model object descriptor. In this embodiment, the GS is derived by taking the ratio of the query volume parameter to the model volume parameter for the descriptor taken from the database. If the ratio is in the interval (1/c, c) where c>1, then the objects are considered similar and GS takes the value 0. Otherwise, GS takes the value infinity. The value of c depends on the application. For example, for feature film, c=5.

If at least one of the query object descriptor and the model object descriptor does not have a global parameter value, then GS=0.

If GS≠0 then a new model object descriptor is selected from the descriptor database; if GS=0, then a view descriptor comparison is performed as follows (step 72).

Each query view descriptor is compared with each view descriptor for the model object descriptor under consideration in a comparator 810 using a matching function to derive view-similarity measures (step 74). A comparison of the ith query view descriptor and the jth model view descriptor results in a view similarity measure $s_{i,j}$.

In more detail the query view descriptor is selected using a selector 600 and the database view descriptor is selected using a selector 700. Firstly, the view descriptor for the first query view is compared with each view descriptor in the model object descriptor from the database. For each pair, a view-similarity value s is computed, using a suitable matching algorithm. In this embodiment, a view-similarity value s is computed using the matching algorithm described in the Mokhtarian, Abbasi and Kittler paper described above. When this particular similarity measure is used, the smaller the view similarity values the closer is the match. This results in a set of k view-similarity measures for the first query view, where k is the number of view descriptors in the model object descriptor under consideration, and the k measures are stored in a global and local similarity combiner 820.

Then view-similarity values are computed and stored for the second query view descriptor and the model view descriptors from the database in the same way, resulting in k further view-similarity measures.

For each query view, the minimum view-similarity value for the database descriptor value under consideration is selected (step 76). This minimum value is a measure of the closest match between the respective query view and one of the views in the object descriptor being considered. This results in p minimum view-similarity values where p is the number of query views. In this example, p=2.

An overall similarity measure S for the query descriptor and the model object descriptor being considered is taken as the median of the p similarity values (step 78). This represents the closeness of the match between the query descriptor and the model object descriptor taking all views into account. Thus, if one query view matches a view in the database descriptor closely but the other query view does not match any view in the database descriptor closely, then this is reflected in S by an intermediate value.

The above steps are repeated for each object descriptor in the descriptor database 8, resulting in n similarity measures S, where n is the number of 3D object descriptors in the descriptor database (step 80). The n similarity measures are then ordered (step 82) starting from the lowest value which indicates the closest match. The m lowest values, where m is a value selected by the user or determined by the set-up of the control unit, are then selected, and an image from each of the corresponding m video sequences including the object is displayed on the display unit 4 (step 84).

According to the invention multiple views of a single object are stored to form a complete or quasi-complete description of the outline shape. The representation may be quasi-complete if only views considered important for retrieval are stored. For example, for a typical database storing feature films, only front, back, side and top views of a car may be stored as a unified representation, but the view from under the car is not stored, as it is unlikely that that view will be used as a query.

A system according to the invention may, for example, be provided in an image library. Alternatively, the databases may be sited remote from the control unit of the system, connected to the control unit by a temporary link such as a telephone line or by a network such as the internet. The image and descriptor databases may be provided, for example, in permanent storage or on portable data storage media such as CD-ROMs or DVDs.

Components of the system as described such as the selectors and comparators may be provided in software or hardware form. Although the invention has been described in the form of a computer system, it could be implemented in other forms, for example using a dedicated chip.

Specific examples have been given of methods of representing a 2D shape of an object and of methods for calculating values representing similarities between two shapes but any suitable such methods can be used.

The various views of an object making up the complete or quasi-complete shape description may, for example, be provided by the film producer. For example, in a film including a car, the producer may arrange for 20 different views of the car to be shot for use in indexing the film in the database. Alternatively, a link may be provided between all the different views of an object in a sequence to enable the views to be found, and the shape for any useful views not appearing in the sequence may, for example, be provided when data for the first view of the object is included.

The invention can also be used for example, for matching images of objects for verification purposes, or for filtering.

The invention is applicable to single images, and images in a sequence of images, such as images from a film or a video, or a collection of images that are associated in some way, such as being on the same web page.

I claim:

1. A method of representing a sequence of images constituting a video segment, by processing signals corresponding to the image, the method comprising:

identifying an object appearing in one image in the sequence in a first perspective view and identifying the same object appearing in another image in the sequence in a second perspective view;

deriving a view descriptor of the outline of the object in the first perspective view and at least one additional view descriptor of the outline of the object in another perspective view, associating the two or more view descriptors to form a descriptor which is a single indexable entity for said sequence of images, and wherein one of the at least one additional view descriptors corresponds to the outline of the object in the second perspective view also appearing in the image sequence, wherein the view descriptors are derived using a curvature scale space representation.

2. A method as claimed in claim 1 further comprising deriving a descriptor of the object which is related to the shape the object and which is independent of the view of the object in the image.

3. A method of representing an object appearing in an image to index the respective image or sequence of images of which it is a part for searching purposes, the method comprising deriving a plurality of view descriptors corresponding to a plurality of two-dimensional outlines of the object in different views, by processing signals corresponding to the outlines, and associating the view descriptors to form an object descriptor which is a single indexable entity for said respective image or image sequence, wherein the view descriptors are derived using a curvature scale space representation.

4. An image search and retrieval system adapted for implementing a method as claimed in claim 1.

5. A computer system programmed to operate according to a method as claimed in claim 1.

6. A computer-readable storage medium storing computer-executable process steps for implementing a method as claimed in claim 1.

7. The method of claim 1 wherein other images in the image sequence do not include the object.

* * * * *